C. J. ZINKE.
SCALE PAN.
APPLICATION FILED JAN. 7, 1916.
1,280,936.
Patented Oct. 8, 1918.
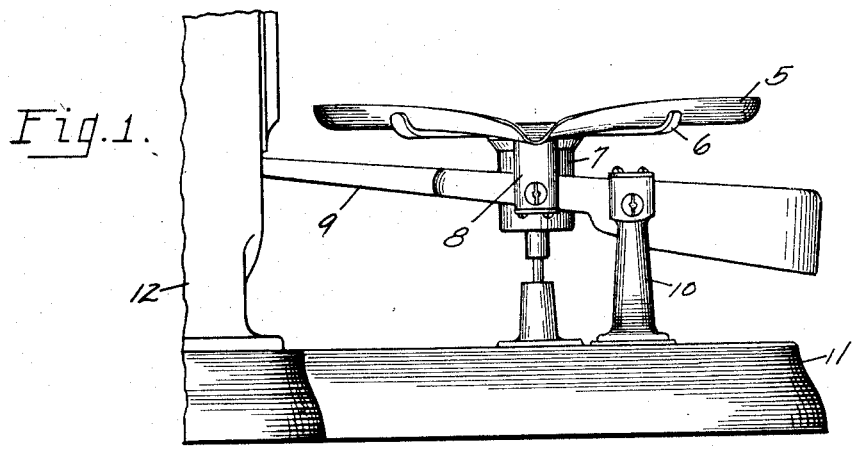
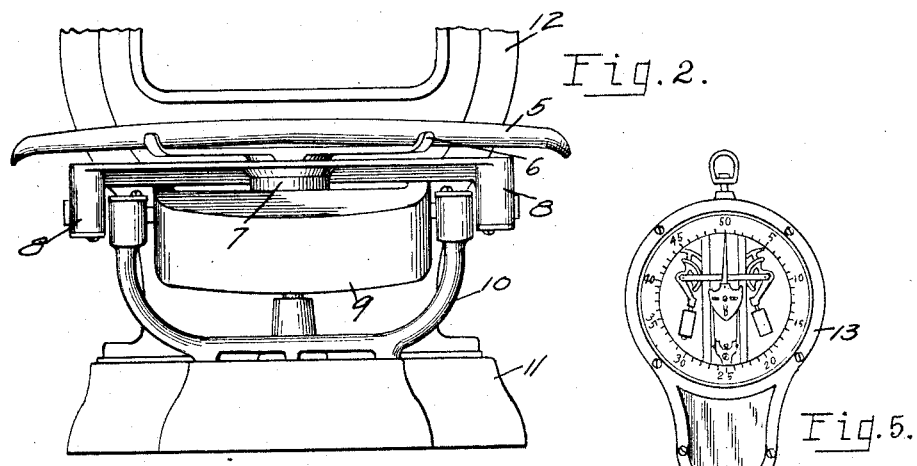
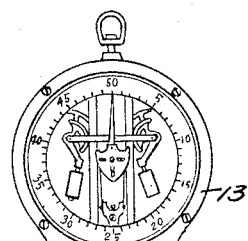
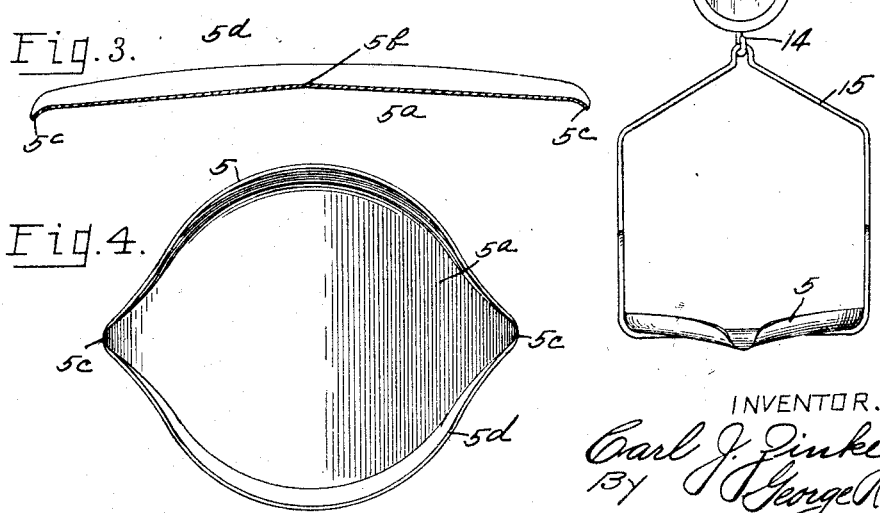
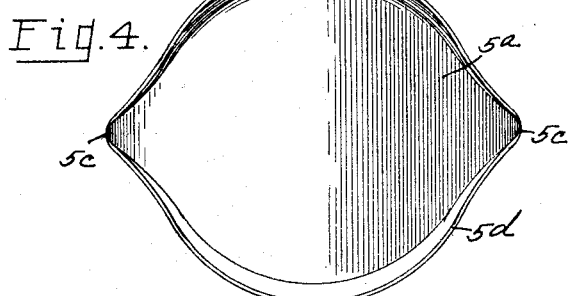
INVENTOR.
Carl J. Zinke
BY George R. Frye
ATTORNEY

UNITED STATES PATENT OFFICE.

CARL J. ZINKE, OF TOLEDO, OHIO, ASSIGNOR TO TOLEDO SCALE COMPANY, OF TOLEDO, OHIO, A CORPORATION OF NEW JERSEY.

SCALE-PAN.

1,280,936. Specification of Letters Patent. Patented Oct. 8, 1918.

Application filed January 7, 1916. Serial No. 70,743.

*To all whom it may concern:*

Be it known that I, CARL J. ZINKE, a subject of the Emperor of Germany and King of Prussia, (who has declared his intention of becoming a citizen of the United States,) and a resident of Toledo, in the county of Lucas and State of Ohio, have invented certain new and useful Improvements in Scale-Pans, of which the following is a specification.

This invention relates to scale pans or commodity-receivers for weighing scales. It has for its primary object to improve the construction of scale pans by providing a sanitary, easily-cleaned scale pan without crevices, joints or recesses in which particles of matter might lodge.

A further object is to provide a scale pan of simple construction that will automatically drain off any liquid, etc., deposited thereon. It is well known that in weighing certain commodities such, for example, as fish, a deposit of liquid, etc., accumulates on the scale pans now in general use, causing great inconvenience to weighmen and seriously impairing the accuracy of the scales. The present invention has been devised to obviate this objection to the scale pans ordinarily used.

Other objects and advantages will readily appear from the following specification, in which reference is had to the accompanying drawings illustrating a preferred embodiment of my invention, and wherein similar reference numerals designate similar parts throughout the several views.

In the drawings:

Figure 1 is a side elevation of the lever mechanism of a counter scale equipped with my improved scale pan; Fig. 2 is an end elevation thereof; Fig. 3 is a longitudinal sectional view through the scale pan; Fig. 4 is a plan view of the scale pan; and Fig. 5 is an elevation of a hanging scale equipped with my improved scale pan.

In the embodiment illustrated in Figs. 1 and 2, the scale pan or commodity-receiver 5 is shown in position upon the lever mechanism of a platform or counter scale of a well-known type, being retained in position by the supporting arms 6 radiating from the center of the frame 7, which frame is provided with bearings resting upon pivots carried by the scale beam or lever 9. The lever 9 is fulcrumed upon bearings carried by the supports 10 extending upwardly from the base 11 of the scale. Adjacent its rear extremity the base 11 carries a housing 12 adapted to inclose the weighing mechanism of the scale, which is suitably connected to the inner end of the scale beam 9 in the usual or any desired manner. It is to be understood that the weighing mechanism of the scale forms no part of the present invention, which is adapted for use with many different types of scales, one example of which is shown in Figs. 1 and 2. To illustrate the adaptability of my scale pan to use with other types of scales I have shown in Fig. 5 a hanging scale of a well-known type wherein the weighing mechanism of the scale is inclosed within a housing 13 and is connected, as by the hook 14, with a suspension frame 15 supporting my improved scale pan.

The scale pan 5 may be formed of any suitable material, such as enameled metal, glass, porcelain, aluminum, etc., and preferably comprises a bottom $5^a$ of substantially the shape shown in Fig. 4 and slanting from a raised central portion $5^b$ toward each end, terminating in downwardly-turned lips or drains $5^c$, as best shown in Fig. 3. Outwardly flaring flanges $5^d$ are provided at the sides of the bottom portion $5^a$ substantially as shown, these flanges being of their greatest height adjacent the central portion of the pan and leading to the lips or drains $5^c$ so as to form guides for conducting liquid, etc., deposited on the bottom $5^a$ to said lips or drains. Thus, whenever a fish or other moisture-carrying commodity is laid upon the scale pan any liquid deposited on the scale pan will be automatically drained therefrom, flowing down the inclined bottom wall $5^a$ to the lips $5^c$ and dripping therefrom into suitable receptacles placed below these lips, which, as shown in Fig. 2, extend a suitable distance beyond the sides of the base 11 of the scale to allow for the disposition of such receptacles. The scale pan is readily removable from the scale for cleansing, or may be cleansed while in position on the scale, the washing liquid readily flowing from the scale pan.

While it will be apparent from the above description that the illustrated embodiment of my invention is well calculated to adequately fulfil the objects of the invention primarily stated, it will be understood that the construction shown is susceptible to modification, variation and change without departing from the spirit and scope of the invention as set forth in the subjoined claims.

Having described my invention, I claim:

1. A scale pan having a bottom wall inclined from the central portion thereof toward both ends, and a lip or drain adjacent each end thereof.

2. A scale pan having a bottom wall inclined from the central portion thereof toward both ends, a lip or drain adjacent each end thereof, and upwardly-extending flanges at the sides of the bottom wall.

3. A scale pan having a bottom wall provided with a raised central portion and inclined therefrom toward each end, a downwardly-extending lip at each end thereof, and side walls leading to said lips, substantially as described.

4. In combination with a scale having a base, a scale beam supported thereon, and a support for a scale pan carried by the scale beam, of a scale pan resting on said support and provided with a lip or drain extending beyond the side of the scale base.

5. In combination with a scale having a base, a scale beam supported thereon, and a support for a scale pan carried by the scale beam, of a scale pan resting on said support and provided with drains at opposite ends thereof, said drains being positioned to extend beyond the sides of the scale base, substantially as described.

CARL J. ZINKE.

Witnesses:
GRANT RICHARD,
HARRY WHITNEY.

Copies of this patent may be obtained for five cents each, by addressing the "Commissioner of Patents, Washington, D. C."